(12) United States Patent
Mattsson et al.

(10) Patent No.: US 9,598,835 B2
(45) Date of Patent: Mar. 21, 2017

(54) CONTINUOUSLY VARIABLE TRANSMISSION AND A WORKING MACHINE INCLUDING A CONTINUOUSLY VARIABLE TRANSMISSION

(71) Applicant: VOLVO CONSTRUCTION EQUIPMENT AB, Eskilstuna (SE)

(72) Inventors: Per Mattsson, Hindås (SE); Mats Akerblom, Eskilstuna (SE); Daniel Stalberg, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 87 days.

(21) Appl. No.: 14/646,034

(22) PCT Filed: Dec. 20, 2012

(86) PCT No.: PCT/SE2012/000213
§ 371 (c)(1),
(2) Date: May 20, 2015

(87) PCT Pub. No.: WO2014/098654
PCT Pub. Date: Jun. 26, 2014

(65) Prior Publication Data
US 2015/0299984 A1    Oct. 22, 2015

(51) Int. Cl.
*F16H 47/04* (2006.01)
*E02F 9/20* (2006.01)
(Continued)

(52) U.S. Cl.
CPC ............... *E02F 9/202* (2013.01); *E02F 9/22* (2013.01); *F16H 3/725* (2013.01); *F16H 37/06* (2013.01);
(Continued)

(58) Field of Classification Search
CPC . E02F 9/202; E02F 9/22; E02F 9/0841; E02F 9/2253; F16H 37/06; F16H 3/725;
(Continued)

(56) References Cited

U.S. PATENT DOCUMENTS

| 3,197,134 A | * | 7/1965 | Boutillon | F16H 3/363 235/1 R |
| 6,997,838 B2 | * | 2/2006 | Folsom | F16H 47/04 475/72 |

(Continued)

FOREIGN PATENT DOCUMENTS

| CN | 102695895 A | 9/2012 |
| WO | 2012008884 A1 | 1/2012 |

OTHER PUBLICATIONS

Chinese Official Action (Oct. 10, 2016) for corresponding Chinese App. 201280077744.2.
(Continued)

*Primary Examiner* — David J Hlavka
(74) *Attorney, Agent, or Firm* — WRB-IP LLP

(57) ABSTRACT

A continuously variable transmission includes a variator unit having a variator input shaft and a variator output shaft; a first planetary gear set having a first, a second and a third planetary member, the first planetary member being one of a ring wheel and a planet carrier, the second planetary member being the other one of the ring wheel and the planet carrier, and the third planetary member being a sun wheel, wherein the first planetary member of the first planetary gear set is operatively connected to a transmission input shaft; and a second planetary gear set having a sun wheel, a ring wheel and a planet carrier, the planet carrier being operatively connected to a transmission output shaft; wherein the variator input shaft is operatively connected to the second planetary member of the first planetary gear set; the variator output shaft is operatively connected to the sun wheel of the
(Continued)

first planetary gear set, the sun wheel of the first planetary gear set being further operatively connected to the sun wheel of the second planetary gear set while having a variable gear ratio between the transmission input shaft and the transmission output shaft; and the ring wheel of the second planetary gear set being selectively connectable to the second planetary member of the first planetary gear set and to a gearbox housing of the continuously variable transmission.

32 Claims, 13 Drawing Sheets

(51) Int. Cl.
*F16H 3/72* (2006.01)
*F16H 37/06* (2006.01)
*E02F 9/08* (2006.01)
*E02F 9/22* (2006.01)
*F16H 37/08* (2006.01)

(52) U.S. Cl.
CPC ............ *F16H 47/04* (2013.01); *E02F 9/0841* (2013.01); *E02F 9/2253* (2013.01); *F16H 2037/0873* (2013.01); *F16H 2200/2007* (2013.01)

(58) Field of Classification Search
CPC ............. F16H 47/04; F16H 2037/0873; F16H 2200/2007
See application file for complete search history.

(56) References Cited

U.S. PATENT DOCUMENTS

| | | | |
|---|---|---|---|
| 7,220,203 B2 | 5/2007 | Holmes et al. | |
| 7,588,509 B1 | 9/2009 | Marsha | |
| 8,911,317 B2* | 12/2014 | Oschmann | F16H 47/04 475/72 |
| 9,028,354 B2* | 5/2015 | Johnson | B60K 6/12 475/72 |
| 9,090,254 B2* | 7/2015 | Bauer | B60K 6/12 |
| 9,285,015 B2* | 3/2016 | Akerblom | F16H 47/04 |
| 2010/0227723 A1 | 9/2010 | Seo et al. | |
| 2010/0298081 A1 | 11/2010 | Ivanysynova et al. | |
| 2011/0111906 A1 | 5/2011 | Kim et al. | |
| 2013/0226416 A1* | 8/2013 | Seipold | F16H 47/04 701/55 |

OTHER PUBLICATIONS

International Search Report (Sep. 4, 2013) for corresponding International App. PCT/SE2012/000213.
International Preliminary Report on Patentability (Dec. 11, 2014) for corresponding International App. PCT/SE2012/000213.

* cited by examiner

CONTINUOUSLY VARIABLE TRANSMISSION AND A WORKING MACHINE INCLUDING A CONTINUOUSLY VARIABLE TRANSMISSION

BACKGROUND AND SUMMARY

The invention relates to a continuously variable transmission and to a working machine comprising such a continuously variable transmission.

The invention is applicable on working machines within the fields of industrial construction machines, in particular wheel loaders, graders and articulated haulers. Although the invention will be described hereinafter with respect to a wheel loader, the invention is not restricted to this particular machine, but may also be used in other heavy working machines, such as dump trucks, excavators or other construction equipments.

A continuously variable transmission is a transmission which speed ratio can be continuously varied over a designed range. Continuously variable transmissions are useful due to enabling operation of a prime mover at optimum speed or at optimum fuel economy while still providing a desired rotational speed at the output shaft of the transmission. In a continuously variable transmission a speed ratio between the output shaft speed to the input shaft speed of zero may be obtainable. Such a continuously variable transmission is usually referred to as an infinitely variable transmission. The existence of an output to input speed ratio of zero enables a geared neutral function where the input shaft is rotating when the output shaft stands still. The presence of a geared neutral position is useful in many industrial contexts, such as within gearboxes of working machines for example, since it may obviate the need of a starting clutch or a torque converter. Furthermore, infinitely variable transmissions facilitate separation of operation of a hydraulic system included for performing lifting operations and/or steering the working machine from the propulsion of the working machine, since the hydraulic system can be powered from a power take off at an input shaft, which may be kept running, while an output shaft connected to propulsion drive train can be kept at stand still. A typical arrangement of a continuously variable transmission includes a continuously variable unit, variator unit, having a variator input shaft and a variator output shaft connected to a planetary gear system.

An example of a continuously variable transmission is disclosed in U.S. Pat. No. 7,220,203. The continuously variable transmission in U.S. Pat. No. 7,220,203 comprises a battery coupled to two motor/generators, respectively.

Accordingly, the continuously variable transmission in U.S. Pat. No. 7,220,203 is an electrically continuously variable transmission. Moreover, the electrically continuously variable transmission includes an input member to receive power from an engine and an output member for transmitting torque to e.g. the wheels of a working machine. Also, the electrically continuously variable transmission comprises planetary gear sets and a plurality of clutches. An advantage with the electrically continuously variable transmission disclosed in U.S. Pat. No. 7,220,201 is that the plurality of clutches allows additional fixed speed ratios and an additional compound-power-split speed ratio range in relation to the prior art known to U.S. Pat. No. 7,120,203.

However, the continuously variable transmission disclosed in U.S. Pat. No. 7,220,203 is in need of further improvements in terms of e.g. reduced costs in terms of reduced number of components, as well as optimizing the utilization of the variator unit.

It is desirable to provide a continuously variable transmission having improved functionalities in relation to prior art solutions.

According to a first aspect of the present invention there is provided a continuously variable transmission, comprising a variator unit having a variator input shaft and a variator output shaft; a first planetary gear set having a first, a second and a third planetary member, the first planetary member being one of a ring wheel and a planet carrier, the second planetary member being the other one of the ring wheel and the planet carrier, and the third planetary member being a sun wheel, wherein the first planetary member of the first planetary gear set is operatively connected to a transmission input shaft; and a second planetary gear set having a sun wheel, a ring wheel and a planet carrier, the planet carrier being operatively connected to a transmission output shaft; wherein the variator input shaft is operatively connected to the second planetary member of the first planetary gear set; the variator output shaft is operatively connected to the sun wheel of the first planetary gear set, the sun wheel of the first planetary gear set being further operatively connected to the sun wheel of the second planetary gear set while having a variable gear ratio between the transmission input shaft and the transmission output shaft; and the ring wheel of the second planetary gear set being selectively connectable to the second planetary member of the first planetary gear set and to a gearbox housing of the continuously variable transmission.

The wording "selectively connectable" should in the following and throughout the entire description be interpreted as two or more components being arranged to be actively connected/disconnected to each other. When discussing "selectively connectable" by means of components in a planetary gear set, the connection between e.g. a sun wheel and a ring wheel via the planet wheels of a planet carrier should not be construed such as the sun wheel being connected to the ring wheel unless otherwise described, which will be discussed further below. Accordingly, in order for a component of a planetary gear set to be connected to another component of the same planetary gear set, the two components must, in order to be connectable to each other in accordance with the intended interpretation of the wording in the present application, be locked to each other in some way or another.

An advantage of the present invention is that the variator output shaft is connected to the sun wheel of the first planetary gear set and the sun wheel of the second planetary gear set, thereby providing a desired maximum speed of the variator output shaft, while having a variable gear ratio between the transmission input shaft and the transmission output shaft. Also, the continuously variable transmission comprises fewer components in relation to prior art solutions, or more specifically, the present invention is not in need of all the clutches described in the prior art.

According to an example embodiment, a first clutch unit may be arranged between the second planetary member of the first planetary gear set and the ring wheel of the second planetary gear set, and a second clutch unit may be arranged between the ring wheel of the second planetary gear set and the gearbox housing.

Hereby, the first clutch unit may be arranged to controllably connect the second planetary member of the first planetary gear set to the ring wheel of the second planetary gear set. Further, the ring wheel of the second planetary gear set is then also connected to the variator input shaft.

Moreover, the second clutch unit hence allows for connection between the ring wheel of the second planetary gear set to the gearbox housing of the continuously variable transmission, i.e. the ring wheel of the second planetary gear set can, by means of the second clutch unit, be locked to the gearbox housing of the continuously variable transmission.

By means of the first clutch unit and the second clutch unit, a first and a second operating mode of the continuously variable transmission is enabled. In the event the ring wheel of the second planetary gear set is connected to the gearbox housing, the continuously variable transmission will be worked in the first operating mode where the second planetary gear set will work as a reduction gear set enabling a large transmission ratio over the second planetary gear set. In the event the ring wheel of the second planetary gear set is connected to the second member of the first planetary gear set, the continuously variable transmission will be worked in the second operating mode, where the first and second planetary gear sets will work as a bridge, where the variator input shaft and the variator output shaft are neither connected to the transmission input shaft nor the transmission output shaft. Hence, in the first operating mode the second planetary gear set works as a reduction gear set and in the second operating mode the second planetary gear set merges power supplied to its sun wheel and ring wheel. Accordingly, a mode selection arrangement may be provided which enables different operating modes with different bands of continuously variable speed ratios between the transmission input shaft and the transmission output shaft.

Moreover, the mode selection arrangement may, in addition to the clutch units, comprise a set of actuators. The actuators may control the engagement and disengagement of the clutch units. Still further, the mode selection arrangement may include a control unit or the like for operating the actuators.

According to an example embodiment, the first clutch unit and/or the second clutch unit may be a friction disc clutch unit.

A friction disc clutch unit is well known and easy to control. Also, the friction disc clutch unit has the advantage of being able to slip into engagement, providing a relatively even and smooth transition from a disengaged state to an engaged state, or vice versa. The friction disc clutch unit may be either a wet friction disc clutch unit or a dry friction disc clutch unit. However, other types of clutches are of course also conceivable, such as e.g. a dog clutch.

According to an example embodiment, the continuously variable transmission may further comprise a gear wheel connected to the variator input shaft, and a gear wheel connected to the second planetary member of the first planetary gear set, the gear wheels are in meshed connection with each other. The gear wheel connected to the second planetary member of the first planetary gear set may be further selectively connectable to the ring wheel of the second planetary gear set.

An advantage is that, by means of these gear wheels, the maximum speed of the variator input shaft may be adapted to various types of machines used in the variator unit.

According to an example embodiment, the continuously variable transmission may further comprise a gear wheel connected to the sun wheel of the first planetary gear set, and a gear wheel connected to the sun wheel of the second planetary gear set; the gear wheels are in meshed connection with each other. The gear wheel connected to the sun wheel of the first planetary gear set may be further connected to the variator output shaft.

According to an example embodiment, the continuously variable transmission may further comprise a gear wheel connected to the second planetary member of the first planetary gear set, and a gear wheel selectively connectable to the ring wheel of the second planetary gear set, wherein the gear wheels are in meshed connection with each other.

By arranging a gear wheel connected to the sun wheel of the first planetary gear set which is in meshed connection with a gear wheel connected to the sun wheel of the second planetary gear set, in combination with arranging a gear wheel connected to the second planetary member of the first planetary gear set which is in meshed connection with a gear wheel selectively connectable to the ring wheel of the second planetary gear set, a difference in geometric level between the first and the second planetary gear sets is provided. Hereby, the prime mover of a working machine can be positioned at a higher geometric level in comparison to the wheels of the working machine. Also, the freedom of choosing basic speed ratios of the first and the second planetary gear sets may be increased by adjusting the gear ratios of the two gear stages obtained by the mentioned gear wheels.

According to an example, the gear wheel selectively connectable to the ring wheel of the second planetary gear et may be further connected to the variator input shaft. According to another example, the gear wheel connected to the second member of the first planetary gear set may be further connected to the variator input shaft.

According to an example embodiment, the continuously variable transmission may further comprise a gear wheel connected to the sun wheel of the first planetary gear set, and a gear wheel connected to the variator output shaft; the gear wheels are in meshed connection with each other. The gear wheel connected to the variator output shaft may be further connected to the sun wheel of the second planetary gear set.

According to an example embodiment, the continuously variable transmission may further comprise a gear wheel connected to the ring wheel of the second planetary gear set, and a gear wheel selectively connectable to the variator input shaft; the gear wheels are in meshed connection with each other. The gear wheel selectively connectable to the variator input shaft may be further selectively connectable to the gearbox housing of the continuously variable transmission.

Hereby, a further difference in geometric level between the first and the second planetary gear sets is provided.

According to an example embodiment, one of the sun wheel, the ring wheel and the planet carrier of the second planetary gear set may be selectively connectable to another one of the sun wheel, the ring wheel and the planet carrier of the second planetary gear set.

Hereby, the continuously variable transmission enables for a third operating mode by simply selectively connecting one of the components of the second planetary gear set to another one of the components of the second planetary gear set. In this third operating mode, the second planetary gear set is by-passed or locked together as a direct gear without any increase/decrease in gear ratio, i.e. a 1:1 relationship of input to output of the second planetary gear set. By use of the third operating mode, the continuously variable transmission is provided with a mode which is faster than the second operating mode. Accordingly, the three operating modes are executed in its consecutive order when accelerating the vehicle, i.e. first the continuously variable transmission is operated by the first operating mode, then by the second operating mode and finally by the third operating mode.

It should be readily appreciated that the wording "selectively connectable" should be interpreted such that one of the sun wheel, the ring wheel and the planet carrier is able to be locked to another one of the sun wheel, the ring wheel and the planet carrier. Accordingly, the two components being connected to each other do not have a relative speed difference between themselves.

Furthermore, the components, i.e. one of the sun wheel, the ring wheel and the planet carrier may be selectively connectable to another one of the sun wheel, the ring wheel and the planet carrier by means of e.g. a clutch unit or the like. The clutch unit may, for example, be a friction disc clutch unit or any other suitable clutch unit such as those described above in relation to the description of the first clutch unit and the second clutch unit.

According, to an example embodiment, the sun wheel of the second planetary gear set may be selectively connectable to the planet carrier of the second planetary gear set.

Hereby, a clutch unit may be positioned between the sun wheel and the planet carrier of the second planetary gear set. When connecting the sun wheel to the planet carrier, the second planetary gear set will be by-passed and hence un-loaded.

According to an example embodiment, the planet carrier of the second planetary gear set may be selectively connectable to the ring wheel of the second planetary gear set.

Hereby, a clutch unit may be positioned between the planet carrier and the ring wheel of the second planetary gear set.

According to an example embodiment, the sun wheel of the second planetary gear set may be selectively connectable to the ring wheel of the second planetary gear set.

Hereby, a clutch unit may be positioned between the sun wheel and the dug wheel of the second planetary gear set. The power to the sun wheel and the power to the ring wheel will be merged together and thereafter provided to the planet carrier.

Accordingly, an advantage is that by simply providing the additional clutch unit enables for the third operating mode for the continuously variable transmission.

According to an example embodiment, the continuously variable transmission may further comprise a gear wheel selectively connectable to the sun wheel of the first planetary gear set, and a gear wheel connected to the ring wheel of the second planetary gear set; the gear wheels are in meshed connection with each other. The gear wheel connected to the ring wheel of the second planetary gear set may be further selectively connectable to the second planetary member of the first planetary gear set and to the gearbox housing of the continuously variable transmission.

Hereby, a further set of gear wheels are arranged between the sun wheel and the ring wheel of the second planetary gear set. This further gear set, in combination with the gear set having a gear wheel connected to the sun wheel of the second planetary gear set and a gear wheel connected to the sun wheel of the first planetary gear set and to the variator output shaft, enables for a fixed ratio in rotational speed between the sun wheel of the second planetary gear set and the ring wheel of the second planetary gear set. Accordingly, a clutch unit or the like may be positioned between this further gear set and the variator output shaft. Hereby, the further set of gear wheels, in combination with the gear set having a gear wheel connected to the sun wheel of the second planetary gear set and a gear wheel connected to the sun wheel of the first planetary gear set and to the variator output shaft, makes it possible to choose gear ratio between the sun wheel of the second planetary gear set and the ring wheel of the second planetary gear set.

Accordingly the above described 1:1 relationship for the second planetary gear set may be adjusted such that another gear ratio is provided, or keeping the 1:1 relationship if desired. Hence, the flexibility of choosing gear ratio between input and output for the second planetary gear set is increased.

Hence, the above description that the connection between components of the second planetary gear set should be interpreted as a connection which does not allow for a relative motion between the connected components is not fully applicable to this example embodiment of the present invention, since, as described, a relative motion is possible by means of the intermediate gear wheels.

According to an example embodiment, the variator unit may have a first hydraulic machine provided with the variator input shaft and a second hydraulic machine provided with the variator output shaft, the first and second hydraulic machines being hydraulically connected to each other.

According to an example embodiment, the variator unit may have a first electric machine provided with the variator input shaft and a second electric machine provided with the variator output shaft, the first and second electric machines being electrically connected to each other.

According to a second aspect of the present invention there is provided a continuously variable transmission, comprising a variator unit having a variator input shaft and a variator output shaft; a first planetary gear set having a first, a second and a third planetary member, wherein the first planetary member of the first planetary gear set is operatively connected to a transmission input shaft; and a second planetary gear set having a first, a second and a third planetary member, the third planetary member of the second planetary gear set being operatively connected to a transmission output shaft; wherein the variator input shaft is operatively connected to the second planetary member of the first planetary gear set; the variator output shaft is operatively connected to the third planetary member of the first planetary gear set, the third planetary member of the first planetary gear set being further operatively connected to the first planetary member of the second planetary gear set; the second planetary member of the second planetary gear set being selectively connectable to the second planetary member of the first planetary gear set and to a gearbox housing of the continuously variable transmission, and wherein one of the first, the second and the third member of the second planetary gear set is selectively connectable to another one of the first, the second and the third member of the second planetary gear set.

Effects and features of this second aspect of the present invention are largely analogous to those described above in relation to the first aspect of the present invention.

According to an example embodiment, the first planetary member of the second planetary gear set may be selectively connectable to the second planetary member of the second planetary gear set.

According to an example embodiment, the first planetary member of the second planetary gear set may be selectively connectable to the third planetary member of the second planetary gear set.

According to an example embodiment, the second planetary member of the second planetary gear set may be selectively connectable to the third planetary member of the second planetary gear set.

According to an example embodiment, the first planetary member of the first planetary gear set may be one of a ring wheel and a planet carrier, the second planetary member of the first planetary gear set may be the other one of the ring wheel and the planet carrier, and the third planetary member may be a sun wheel.

According to an example embodiment, the first planetary member of the second planetary gear set may be a sun wheel, the second planetary member may be a ring wheel, and the third planetary member may be a planet carrier.

According to an example embodiment, the variator unit may have a first hydraulic machine provided with the variator input shaft and a second hydraulic machine provided with the variator output shaft, the first and second hydraulic machines being hydraulically connected to each other.

According to an example embodiment, the variator unit may have a first electric machine provided with the variator input shaft and a second electric machine provided with the variator output shaft, the first and second electric machines being electrically connected to each other.

According to a third aspect of the present invention, there is provided a working machine comprising one of the above described continuously variable transmissions in relation to the first and second aspect of the present invention.

Effects and features of this third aspect of the present invention are largely analogous to those described above in relation to the first and second aspects of the present invention.

Further features of, and advantages with, the present invention will become apparent when studying the appended claims and the following description. The skilled person realize that different features of the present invention may be combined to create embodiments other than those described in the following, without departing from the scope of the present invention. For example, the above description of the different advantages of the present invention is only described in relation to driving the vehicle in a forward direction, the various embodiments of the invention are of course also applicable when providing the continuously variable transmission in reversed gear, i.e. when the working machine is driving backwards.

BRIEF DESCRIPTION OF THE DRAWINGS

The above, as well as additional features and advantages of the present invention, will be better understood through the following illustrative and non-limiting detailed description of an exemplary embodiment of the present invention, wherein:

FIG. 2b shows a more detailed illustration of the example embodiment depicted in FIG. 2a;

FIG. 3b shows a more detailed illustration of the example embodiment depicted in FIG. 3a;

FIG. 4b shows a more detailed illustration of the example embodiment depicted in FIG. 4a;

FIG. 5b shows a more detailed illustration of the example embodiment depicted in FIG. 5a;

FIG. 7b shows a more detailed illustration of the example embodiment depicted in FIG. 7a.

DETAILED DESCRIPTION

Figure 1:
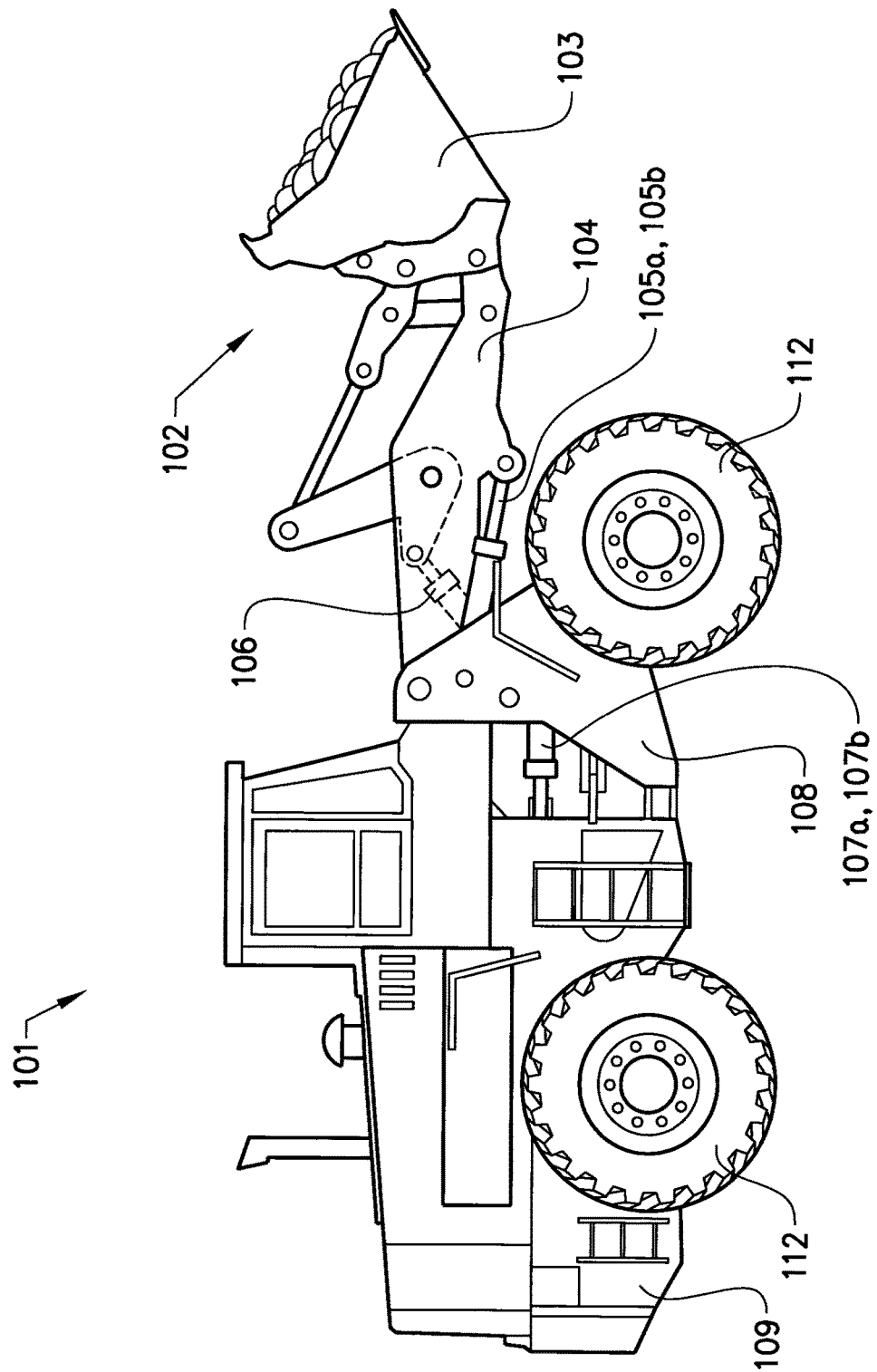
FIG. 1 is a lateral view illustrating an example embodiment of a working machine in the form of a wheel loader having a bucket for loading operations, and a hydraulic system for operating the bucket and steering the wheel loader.

The present invention will now be described more fully hereinafter with reference to the accompanying drawings, in which exemplary embodiments of the invention are shown. The invention may, however, be embodied in many different forms and should not be construed as limited to the embodiments set forth herein rather, these embodiments are provided for thoroughness and completeness. Like reference characters refer to like elements throughout the description.

Reference is now made to FIG. 1, illustrating a working machine 101, here in the form of a wheel loader having an implement 102. The term "implement" is intended to comprise any kind of tool using hydraulics, such as a bucket, a fork or a gripping tool arranged on a wheel loader, or a container arranged on an articulated hauler. The implement illustrated comprises a bucket 103 which is arranged on an arm unit 104 for lifting and lowering the bucket 103, and further the bucket 103 can be tilted or pivoted relative to the arm unit 104. The wheel loader 101 is provided with a hydraulic system comprising at least one hydraulic machine (not shown). The hydraulic machine can be a hydraulic pump, although it is preferred that the hydraulic machine can work as a hydraulic pump as well as a hydraulic motor with a reversed flow of hydraulic fluid. Such a hydraulic machine with said both functions can be used as a pump for providing the hydraulic system with hydraulic fluid, for example to lift and tilt the bucket, and as a hydraulic motor for recuperation of energy, for example during a lowering operation of the implement 102. In the example embodiment illustrated in FIG. 1 the hydraulic system comprises two hydraulic cylinders 105a, 105b for the operation of the arm unit 104 and a hydraulic cylinder 106 for tilting the bucket 103 relative to the arm unit 04. Furthermore the hydraulic system comprises two hydraulic cylinders 107a, 107b arranged on opposite sides of the wheel loader for turning the wheel loader by means of relative movement of a front body part 108 and a rear body part 109. In other words; the working machine is frame-steered by means of the steering cylinders 107a, 107b.

The working machine 101 is also provided with a prime mover, such as an internal combustion engine, and a driveline with a gearbox for supplying power to the driving wheels 112 of the working machine 101.

The gearbox is a continuously variable transmission which gives a plurality of advantages in relation to a stepped gearbox. For example, the velocity of the working machine 01 can be controlled independently of the speed of rotation of the prime mover. If the continuously variable transmission has a speed of rotation range comprising a mode where the rotation speed of the output shaft of the gearbox is zero or close to zero independently of the rotation speed of the input shaft of the gearbox at the same time as torque can be transmitted from the input shaft to the output shaft (usually referred to as an infinitely variable transmission (IVT) with geared neutral), the torque converter traditionally used in working machines can be omitted. By the expression "zero or close to zero" is meant a speed of rotation of the output shaft which is zero or in the size of a few rotations per minute.

By the continuously variable transmission and the geared neutral function, the operation of the hydraulic system can be separated from the propulsion of the working machine for all vehicle speeds. Furthermore, the hydraulic system can be driven by the prime mover when the working machine stands still without using any clutch for disengagement of the prime mover relative to the driveline.

Figure 2A:
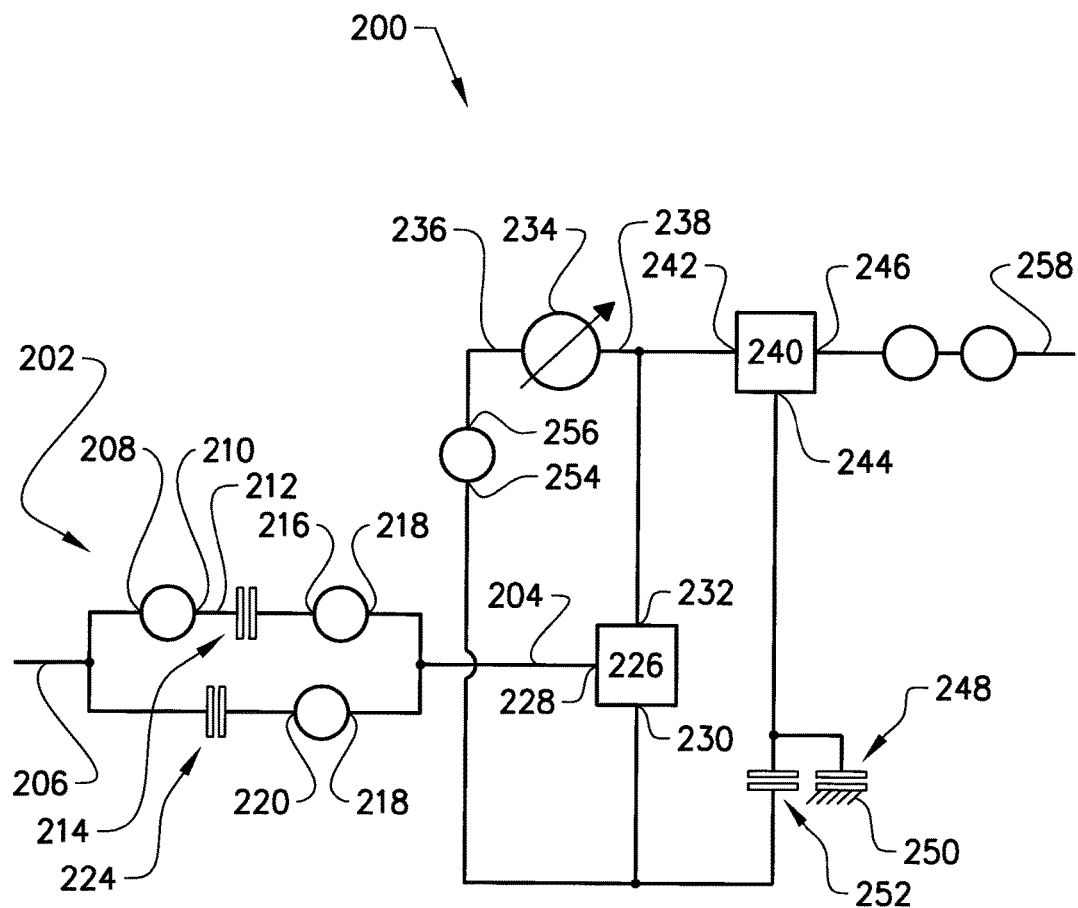
FIG. 2a shows a schematic illustration of a continuously variable transmission according to an example embodiment of the present invention.
Figure 2B:
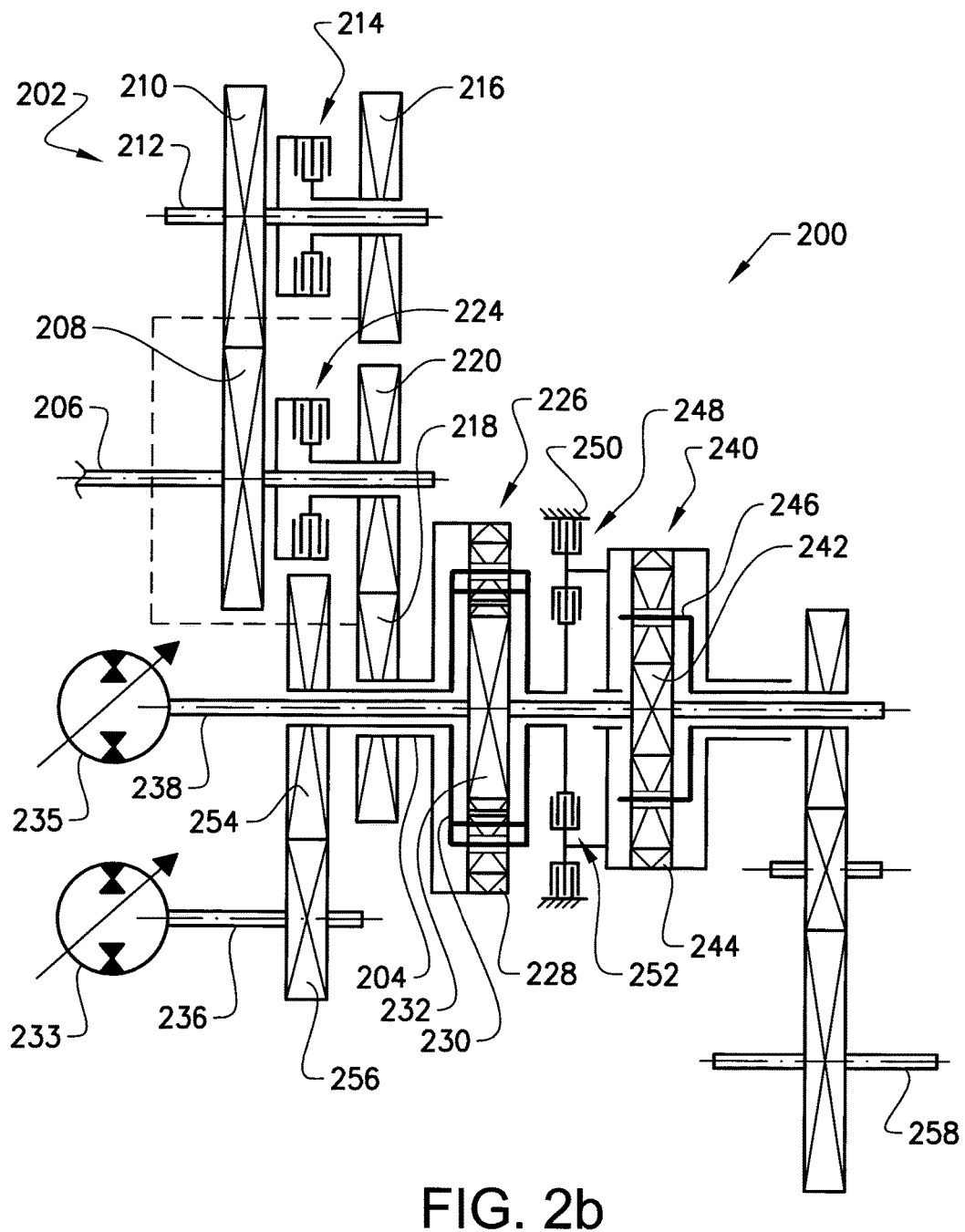

Turning now to FIGS. 2a-2b illustrating a continuously variable transmission 200 according to an example embodiment of the present invention. To the continuously variable transmission 200 is a forward-reverse gear unit 202 added to a transmission input shaft 204 of the continuously variable transmission 200. The forward-reverse gear unit 202 includes an input shaft 205 having a first gear wheel 208 being in meshed connection to a second gear wheel 210 connected to a mid shaft 212. Moreover, a forward clutch unit 214 is connected to the mid shaft 212. The forward clutch unit 214 is further connected to a third gear wheel 26 being in meshed connection to a fourth gear wheel 218. Furthermore, a reverse clutch unit 224 is connected to the input shaft 205 of the forward-reverse gear unit 202. A fifth gear wheel 220 is selectively connectable to the input shaft 206 of the forward-reverse gear unit 202 by means of the reverse clutch unit 224. The fifth gear wheel 220 also being in meshed connection to the fourth gear wheel 218. When the forward clutch unit 214 is engaged, the vehicle is driving in a forward direction and when the reverse clutch unit 224 is engaged, the vehicle is driving in a reverse direction. Accordingly, the forward clutch unit 214 and the reverse clutch unit 224 cannot be engaged at the same time.

The present invention mainly relates to the continuously variable transmission 200. The forward-reverse gear unit 202 is more or less identical for all embodiments described herein and will therefore be omitted in the following text.

Now, the transmission input shaft 204 is coupled to a first planetary gear set 226. More specifically, the transmission input shaft 204 is coupled to a first planetary member 228 of the first planetary gear set 226. In the depicted example embodiment of FIGS. 2a and 2b, the first planetary member 228 is a ring wheel of the first planetary gear set 226. Furthermore, the first planetary gear set 226 also comprises a second planetary member 230 and a third planetary member 232. In the illustrated example embodiment, the second planetary member 230 being a planet carrier of the first planetary gear set 226, while the third planetary member 232 being a sun wheel. It should however be noted that although the first 228, second 230 and third 232 planetary members are illustrated as a ring wheel, a planet carrier and a sun wheel, respectively, other configurations are of course conceivable.

Accordingly, the planet carrier may constitute the first planetary member 228, while the ring wheel may constitute the second planetary member 230, etc.

Furthermore, as depicted in FIG. 2b, the second planetary member 230 of the first planetary gear set 226, which is the planet carrier in the example embodiment, comprises double planet wheels. Accordingly, one of the planet wheels is in meshed connection with the sun wheel and the other one of the planet wheels is in meshed connection with the ring wheel. The planet wheels are also in meshed connection with each other.

Furthermore, the continuously variable transmission 200 comprises a variator unit 234 having a variator input shaft 236 and a variator output shaft 238. The variator unit 234 may be of a hydraulic type including a first hydraulic machine 233 provided with the variator input shaft 236 and a second hydraulic machine 235 provided with the variator output shaft 238, the first 233 and second 235 hydraulic machines being hydraulically connected to each other, or of an electric type including a first electric machine provided with the input shaft 236 of the variator unit 234 and a second electric machine provided with the output shaft 238 of the variator unit 234, the first and second electric machines being electrically connected to each other.

Still further, the continuously variable transmission 200 also comprises a second planetary gear set 240. The second planetary gear set 240 comprises a first planetary member 242, a second planetary member 244, and a third planetary member 246. In the illustrated example embodiment depicted in FIGS. 2a and 2b, the first planetary member 242 is a sun wheel, the second planetary member 244 is a ring wheel, and the third planetary member 246 is a planet carrier. However, other dispositions of the second planetary gear set are of course conceivable, such as e.g. the second planetary member 244 being constituted by the planet carrier, the third planetary member 246 being constituted by the ring wheel, etc. In order to simplify the intelligibility of the text, the first planetary member 242 will in the following and throughout the remaining description be referred to as the sun wheel 242, the second planetary member will be referred to as the ring wheel 244, and the third planetary member will be referred to as the planet carrier 246.

Finally, the continuously variable transmission 200 comprises a first clutch unit 252 and a second clutch unit 248. The first clutch unit 252 being configured to selectively connect the planet carrier 230 of the first planetary gear set 226 to the ring wheel 244 of the second planetary gear set 240. The first clutch unit 252 also selectively connects the ring wheel 244 of the second planetary gear set 240 to the variator input shaft 236. The second clutch unit 248 is positioned between the ring wheel 244 of the second planetary gear set 240 and a gearbox housing 250 of the continuously variable transmission 200.

Now, the following will describe the interconnection between the above described components of the continuously variable transmission 200 depicted in FIGS. 2a and 2b. As described above, the transmission input shaft 204 is coupled to the ring wheel 228 of the first planetary gear set 226, i.e. torque from the prime mover of the working machine 101 is received to the ring wheel 228 of the first planetary gear set 226, via the above described forward-reverse gear unit 202. The sun wheel 232 of the first planetary gear set 226 is further connected to the variator output shaft 238 and to the sun wheel 242 of the second planetary gear set 240. Accordingly, the variator output shaft 238 is also coupled to the sun wheel 242 of the second planetary gear set 240.

Moreover, the planet carrier 230 of the first planetary gear set 226 is coupled to the variator input shaft 236 via a gear stage comprising gear wheels 254, 256 which are in meshed connection with each other.

Accordingly, the first planetary gear set 226 and the variator input shaft 236 are positioned at different levels from each other in the gearbox. It should however be noted that the embodiment depicted in FIGS. 2a and 2b is not limited to the use of the gear wheels 254, 256. Also, and as described above, the planet carrier 230 of the first planetary gear set 226 is selectively connectable to the ring wheel 244 of the second planetary gear set 240 by means of the first clutch unit 252. The ring wheel 244 of the second planetary gear set 240 is further selectively connectable to the gearbox housing 250 of the continuously variable transmission 200 by means of the second clutch unit 248. Finally, the planet carrier 246 of the second planetary gear set 240 is coupled to a transmission output shaft 258, in the depicted example embodiment, via two gear stages.

With the above described first clutch unit 252 and second clutch unit 248, the continuously variable transmission 200 is able to operate in a first and second operating mode. When connecting the ring wheel 244 of the second planetary gear set 240 to the gearbox housing 250, i.e. engaging the second clutch unit 248, the continuously variable transmission 200 is operated in the first operating mode and the second planetary gear set 240 will work as a reduction gear set enabling a large transmission ratio over the second planetary gear set 240. When, on the other hand, engaging the first clutch unit 252, i.e. selectively connecting the ring wheel 244 of the second planetary gear set 240 to the planet carrier 230 of the first planetary gear set 226 as well as to the variator input shaft 236, the continuously variable transmission 200 operates in the second operating mode. In the second operating mode the second planetary gear set 240 merges power supplied to the sun wheel 242 and the ring wheel 244. A further description of the operating modes will be described further below in relation to the description of FIG. 8.

Figure 3A:
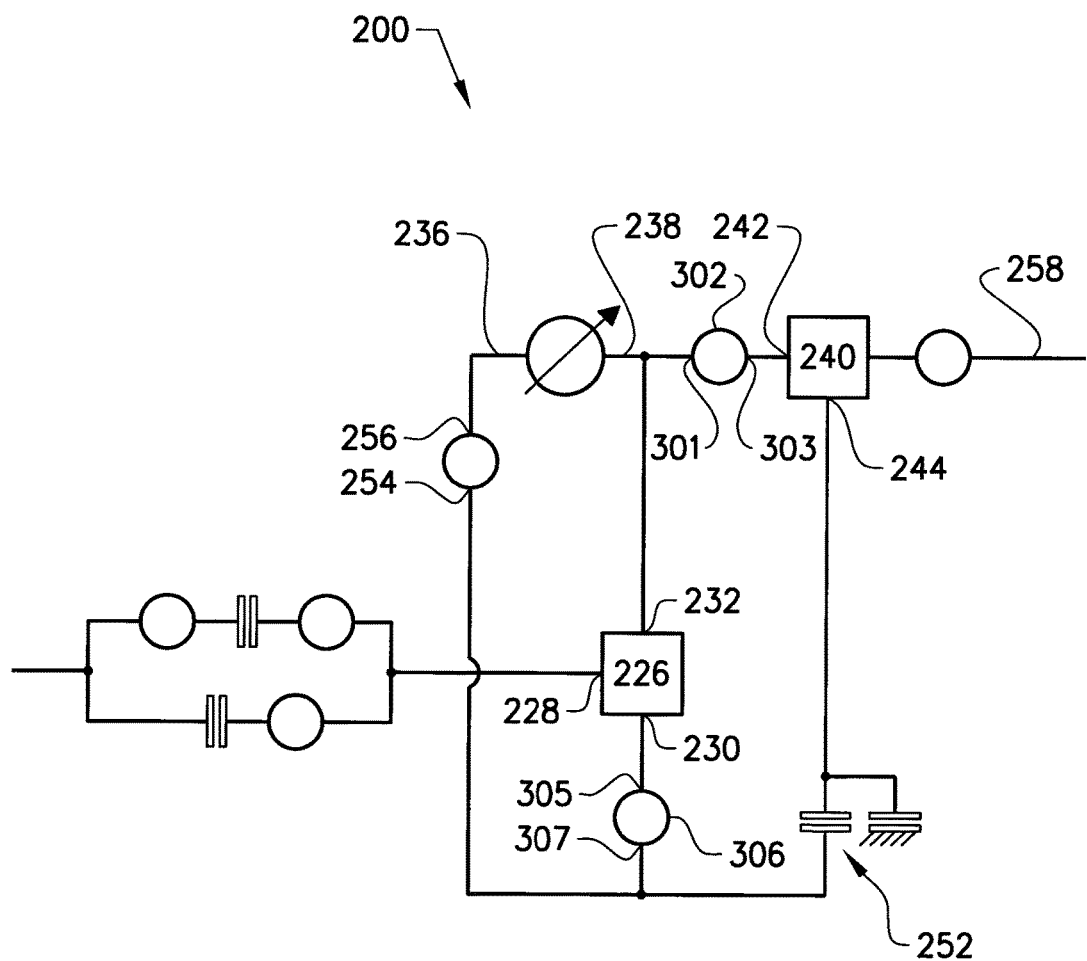
FIG. 3a shows a schematic illustration of a continuously variable transmission according to an example embodiment of the present invention.
Figure 3B:
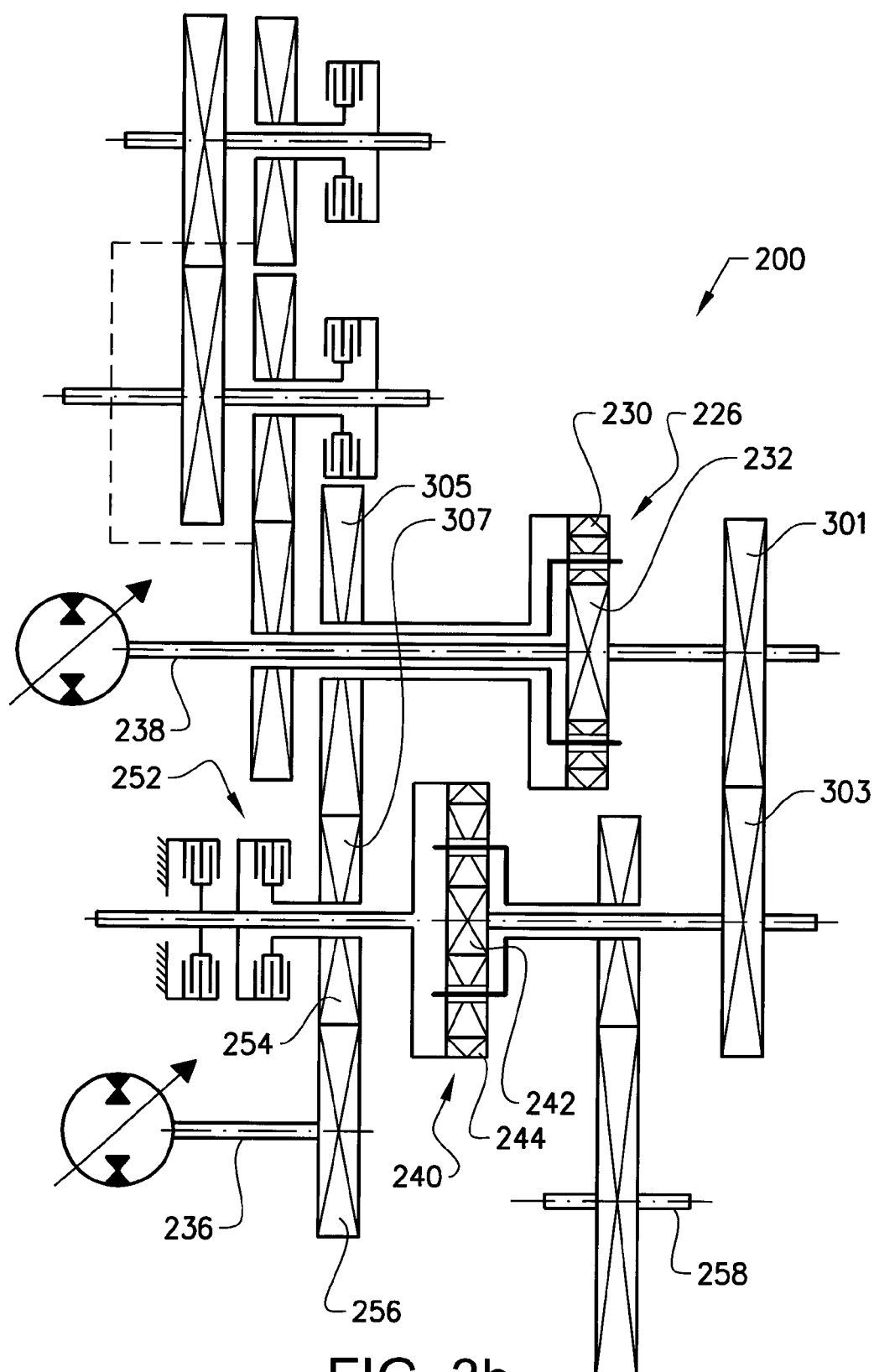

Turning now to FIGS. 3a and 3b, illustrating another example embodiment of the continuously variable transmission 200 according to the present invention. A difference between the embodiment depicted in FIGS. 3a-3b and the embodiment depicted in FIGS. 2a-2b is that a gear stage 302 is arranged between the sun wheel 232 of the first planetary gear set 226 and the sun wheel 242 of the second planetary gear set 240. The gear stage 302 comprises a pair of gear wheels 301, 303 which are in meshed connection with each other. One of the gear wheels 301 is connected to the sun wheel 232 of the first planetary gear set 226 and to the variator output shaft 238. The other gear wheel 303 is connected to the sun wheel 242 of the second planetary gear set 240.

Moreover, another difference between the embodiment depicted in FIGS. 3a-3b and the embodiment depicted in FIGS. 2a-2b is that a further gear stage 306 is arranged between the second planetary member 230 of the first planetary gear set 226 and the variator input shaft 236 as well as the first clutch unit 252. The second planetary member 230 is in the example embodiment depicted in FIGS. 3a-3b a ring wheel. The first planetary member 228 of the first planetary gear set 226 is the planet carrier. The gear stage comprises a pair of gear wheels 305, 307 which are in meshed connection with each other. One of the gear wheels 307 is connected to the variator input shaft 236, via the above described gear wheel 256 in relation to the description of FIGS. 2a-2b, as well as selectively connectable to the ring wheel 244 of the second planetary gear set 240 by means of the first clutch unit 252. The year wheels 307 and 254 are one and the same for the embodiment depicted in FIGS. 3a-3b. The other gear wheel 305 is connected to the ring wheel 230 of the first planetary gear set 226. Still further, the transmission output shaft 258 is in the depicted embodiment of FIGS. 3a-3b provided with only one gear stage instead of two as was the case in the depicted embodiment of FIGS. 2a-2b.

Figure 4A:
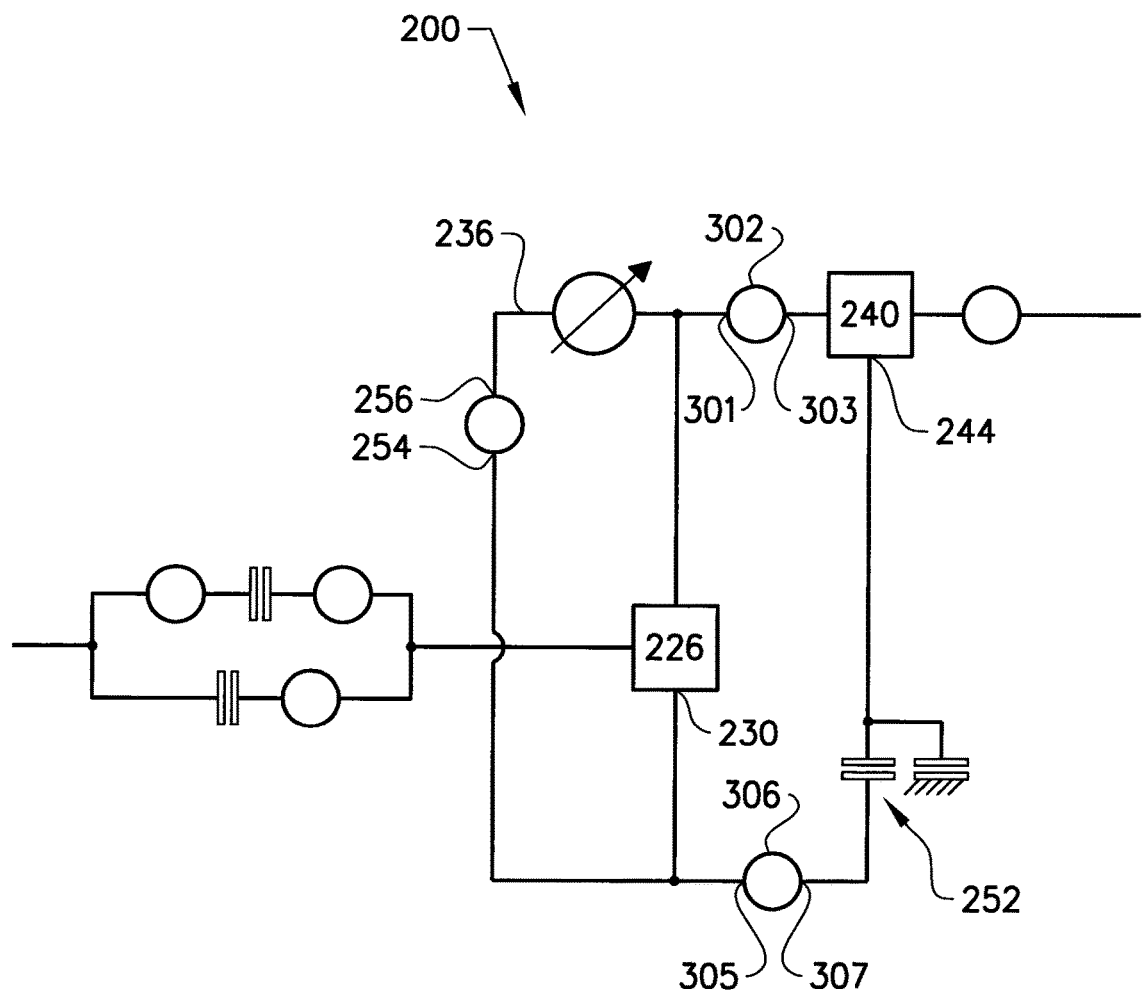
FIG. 4a shows a schematic illustration of a continuously variable transmission according to an example embodiment of the present invention.
Figure 4B:
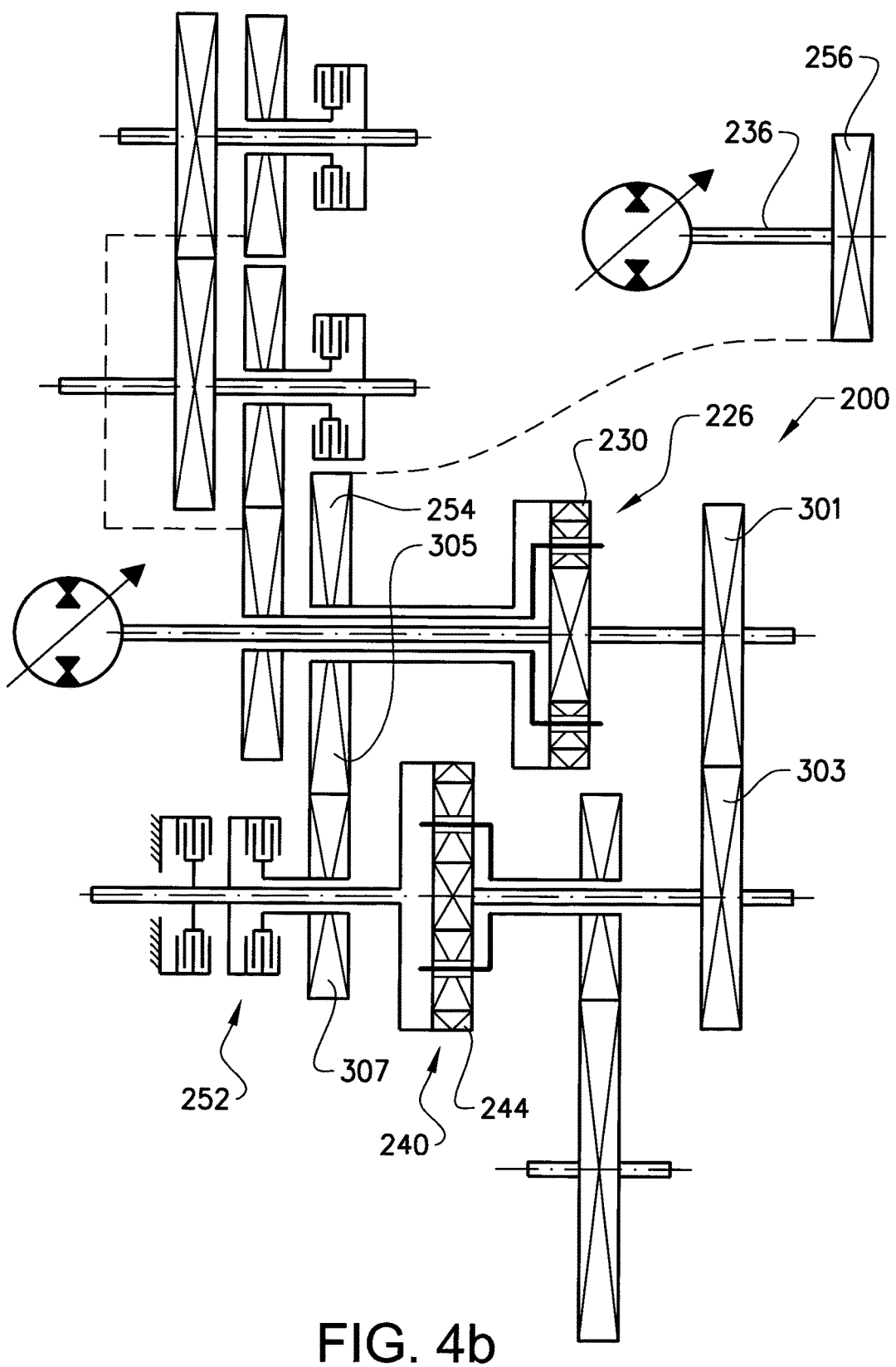

Reference is now made to FIGS. 4a and 4b, illustrating yet another example embodiment of the continuously variable transmission 200 according to the present invention. In the embodiment depicted in FIGS. 4a-4b, the gear wheel 305 that was previously connected to the ring wheel 230 of the first planetary gear set 226 is now further connected to the variator input shaft 236 via the above described gear wheel 256 in relation to the description of FIGS. 2a-2b. The gear wheel 305 and the gear wheel 254 are one and the same in the embodiment depicted in FIGS. 4a-4b. Moreover, the gear wheel 307 that previously was connected to the variator input shaft is now instead only selectively connectable to the ring wheel 244 of the second planetary gear set 240 via the first clutch unit 252.

By providing the gear sets 302 and 306 illustrated in FIGS. 3a-4b, a difference in geometric level may be arranged between the first 226 and second 240 planetary gear sets. Also, by means of the two gear sets 302, 306 an adjustment of the basic speed ratios of the first 226 and second 240 planetary gear sets may be provided.

Figure 5A:
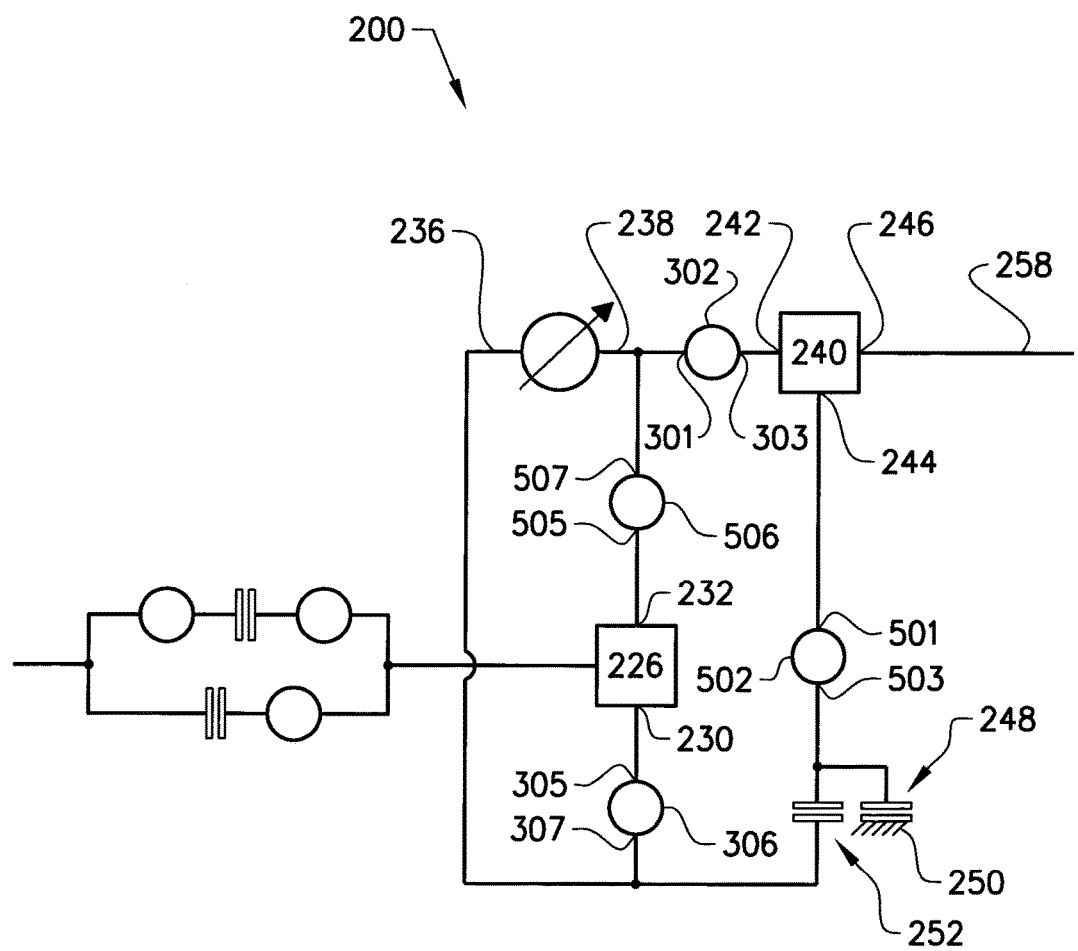
FIG. 5a shows a schematic illustration of a continuously variable transmission according to an example embodiment of the present invention.
Figure 5B:
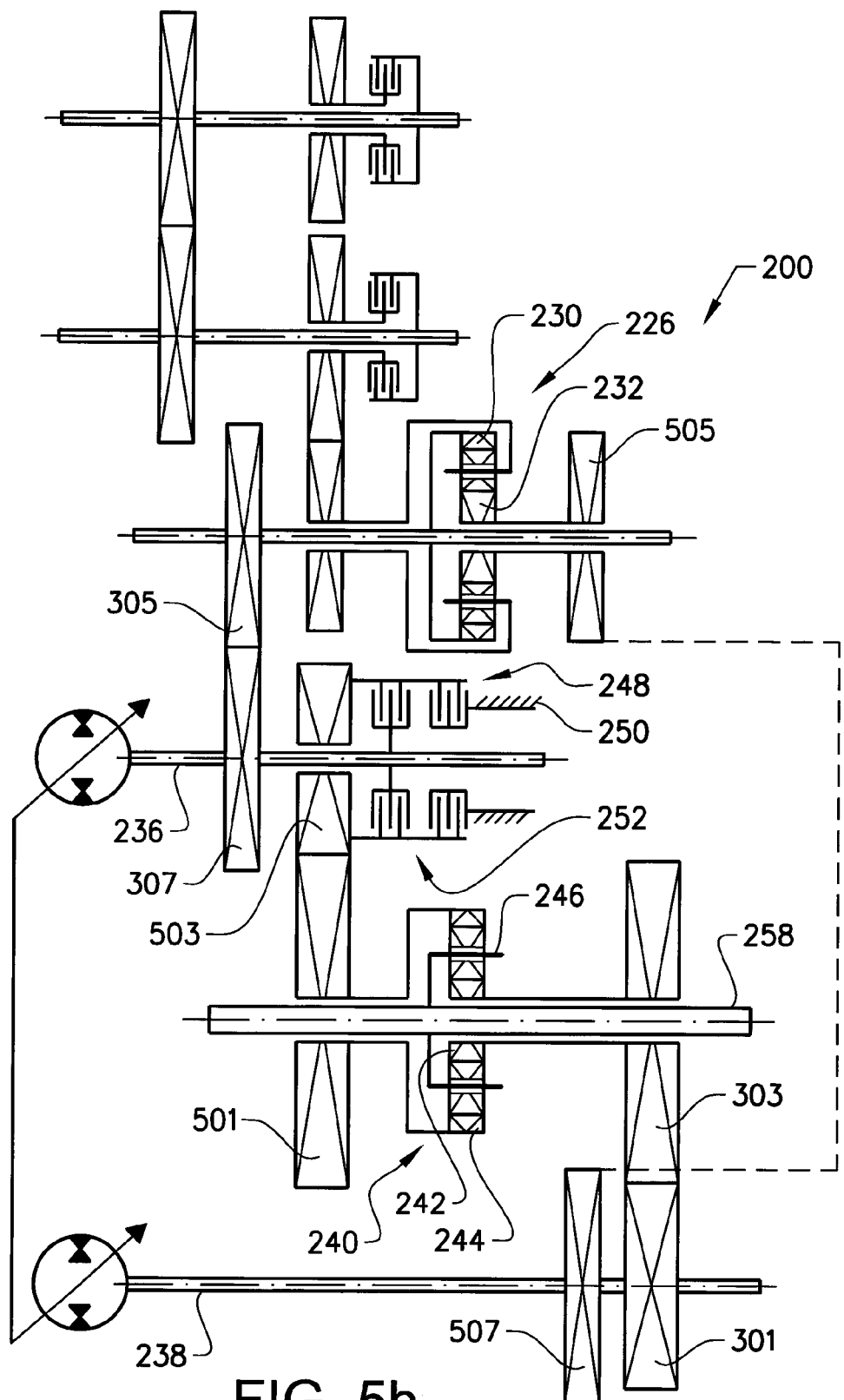

Turning now to FIGS. 5a-5b, illustrating a still further example embodiment of the continuously variable transmission 200 according to the present invention. The embodiment depicted in FIGS. 5a-5b comprises, in comparison to the embodiment depicted in FIGS. 3a-3b, a year stage 502 which is positioned between the ring wheel 244 of the second planetary gear set 240 and the first 252 and second 248 clutch units. The gear stage 502 comprises two gear wheels 501, 503 which are in meshed connection with each other, wherein one of the gear wheels 501 is connected to the ring wheel 244 of the second planetary gear set 240 and the other gear wheel 503 being selectively connectable to the variator input shaft 236 as well as to the gearbox housing 250. It should however be noted that the gear wheel 503 may be positioned such that it is not selectively connectable to the gearbox housing 250. In such a case, the ring wheel 244 of the second planetary gear set 240 is selectively connectable directly to the gearbox housing 250.

Moreover, the embodiment depicted in FIGS. 5a-5b further comprises a gear stage 506 positioned between the sun wheel 232 of the first planetary gear set 226 and the variator output shaft 238 as well as the sun wheel 242 of the second planetary gear set 240. The gear stage 506 comprises two gear wheels 505, 507 which are in meshed connection with each other. One of the gear wheels 505 is connected to the sun wheel 232 of the first planetary gear set 226, while the other one of the gear wheels 507 is connected to the variator output shaft 238 as well as to the sun wheel 242 of the second planetary gear set 240, via the gear stage 302 described above in relation to the description of FIGS. 3a-3b.

Finally, the gear stage 306 described in relation to FIGS. 3a-4b is in the exemplified embodiment depicted in FIGS. 5a-5b positioned as illustrated in FIGS. 3a-3b. Accordingly, one of the gear wheels 305 is connected to the ring wheel 230 of the first planetary gear set 226, while the other one of the gear wheels 307 is connected to the variator input shaft 236 as well as selectively connectable to the ring wheel 244 of the second planetary gear set 240 via the first clutch unit 252. However, it should be noted that, the gear stage 306 may be equally positioned as illustrated in FIGS. 4a-4b. Also, there is no gear stage arranged on the transmission output shaft 258.

Accordingly, the planet carrier 246 of the second planetary gear set 240 constitutes the transmission output shaft 258 for the embodiment depicted in FIGS. 5a-5b. Hereby, the bearing arrangement fir the second planetary gear set 240 may be simplified in comparison to the other described example embodiments.

The above description in relation to FIGS. 2a-5b hence relates to different embodiments of a continuously variable transmission according to the present invention. Although gear stages have been described and positioned differently in the different embodiments, other configurations and alternations are of course conceivable. Also, the embodiments depicted and described in relation to FIGS. 2a-5b enables the continuously variable transmission to operate in a first and a second operating mode. However, by slightly modifying the continuously variable transmission, also a third operating mode can be provided.

Figure 6A:
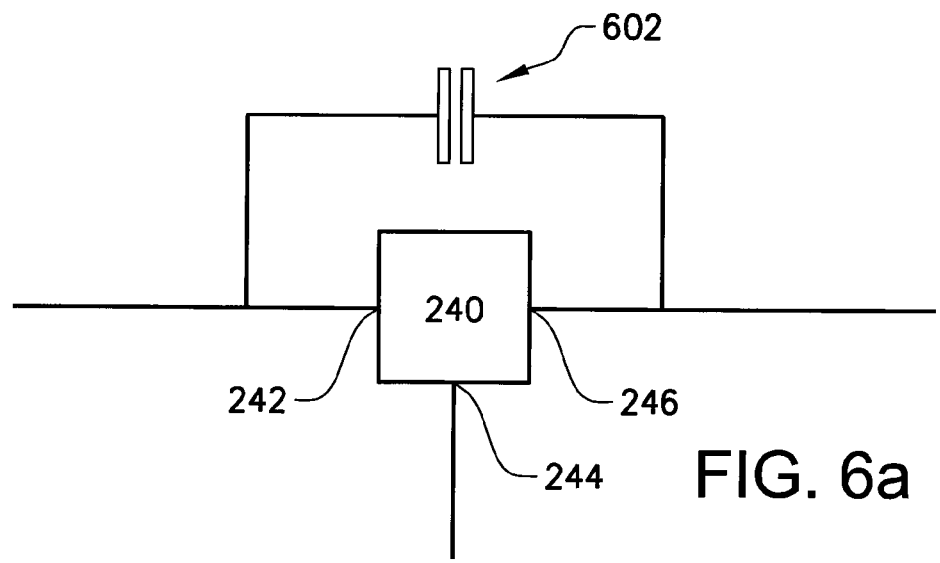
FIGS. 6a-6c illustrate example embodiments of the present invention for enabling a third operating mode for the continuously variable transmission.
Figure 6B:
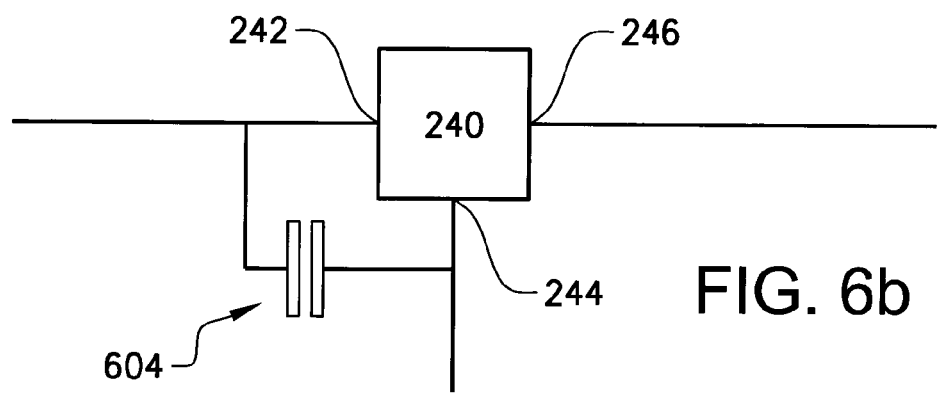
Figure 6C:
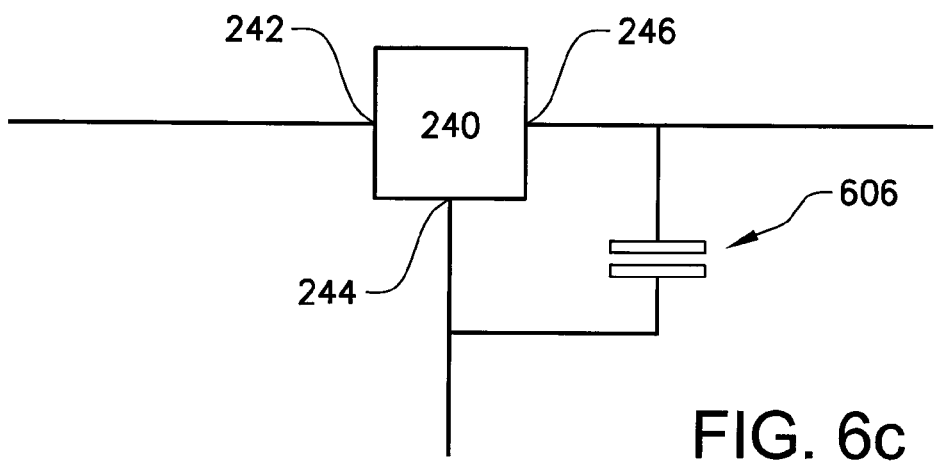

Therefore, reference is now made to FIGS. 6a-6c, which illustrate three different example embodiments for providing a third operating mode to the continuously variable transmission 200 described above in relation to the description of FIGS. 2a-5b. Accordingly, the example embodiments of FIGS. 6a-6c are applicable for all the previously described example embodiments of the present invention.

Turning first to FIG. 6a, the sun wheel 242 of the second planetary gear set 240 is selectively connectable to the planet carrier 246 of the second planetary gear set 240 by means of a clutch unit 602. Hereby, the second planetary gear set 240 can be locked together providing a 1:1 gear ratio between sun wheel 242 and the planet carrier 246. Hence, in this case, the second planetary gear set 240 is by-passed.

In FIG. 6b, on the other hand, the sun wheel 242 of the second planetary gear set 240 is selectively connectable to the ring wheel 244 of the second planetary gear set 240 by means of a clutch unit 604. Hereby, the second planetary gear set 240 can be locked together providing a 1:1 gear ratio between sun wheel 242 and the ring wheel 244.

Finally, in FIG. 6c, the ring wheel 244 of the second planetary gear set 240 is selectively connectable to the planet carrier 246 of the second planetary gear set 240 by means of a clutch unit 606. Hereby, the second planetary gear set 240 can be locked together providing a 1:1 gear ratio between ring wheel 244 and the planet carrier 246.

With the embodiments depicted in FIGS. 6a-6c, the second planetary gear set 240 is locked together or by-passed, thereby not using the second planetary gear set 240 as a reduction gear which enables for a third operating mode providing increased output speed of the continuously variable transmission. A further description of the third operating mode will be provided below in relation to the description of FIG. 8.

Figure 7A:
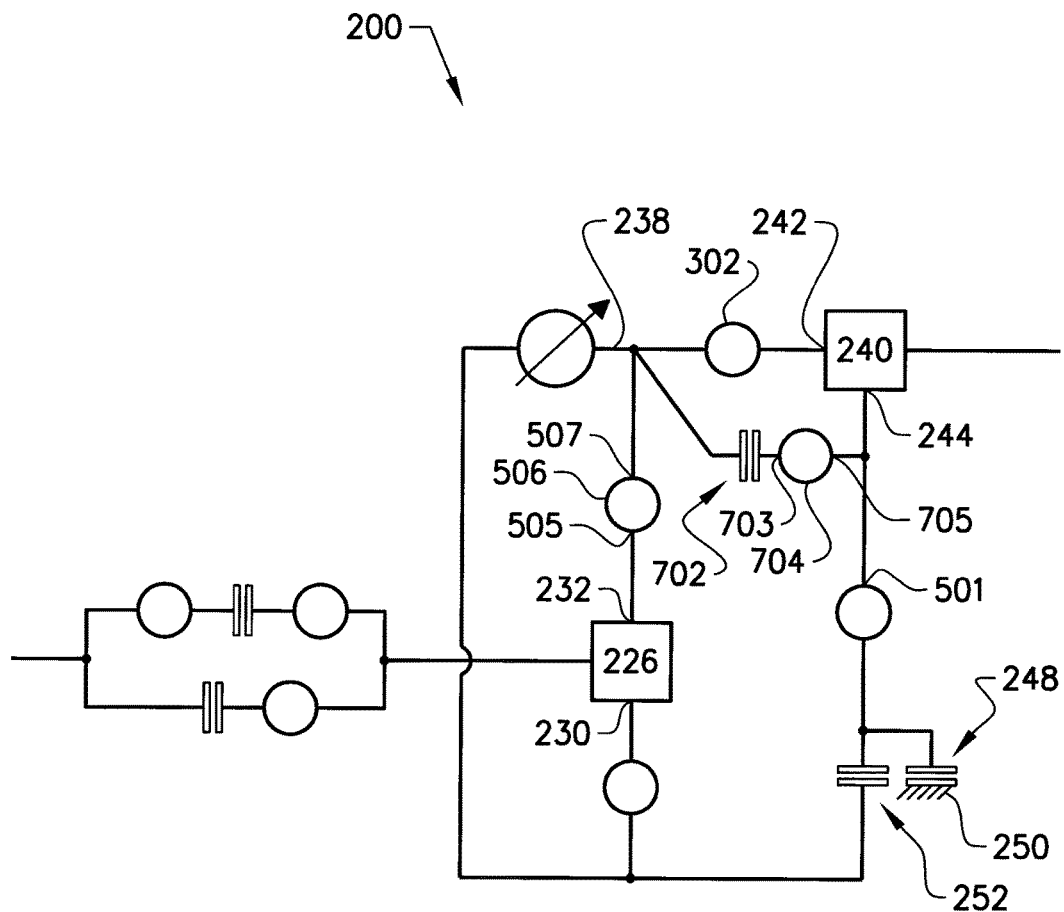
FIG. 7a shows a schematic illustration of a further example embodiment for enabling a third operating mode for the continuously variable transmission.
Figure 7B:
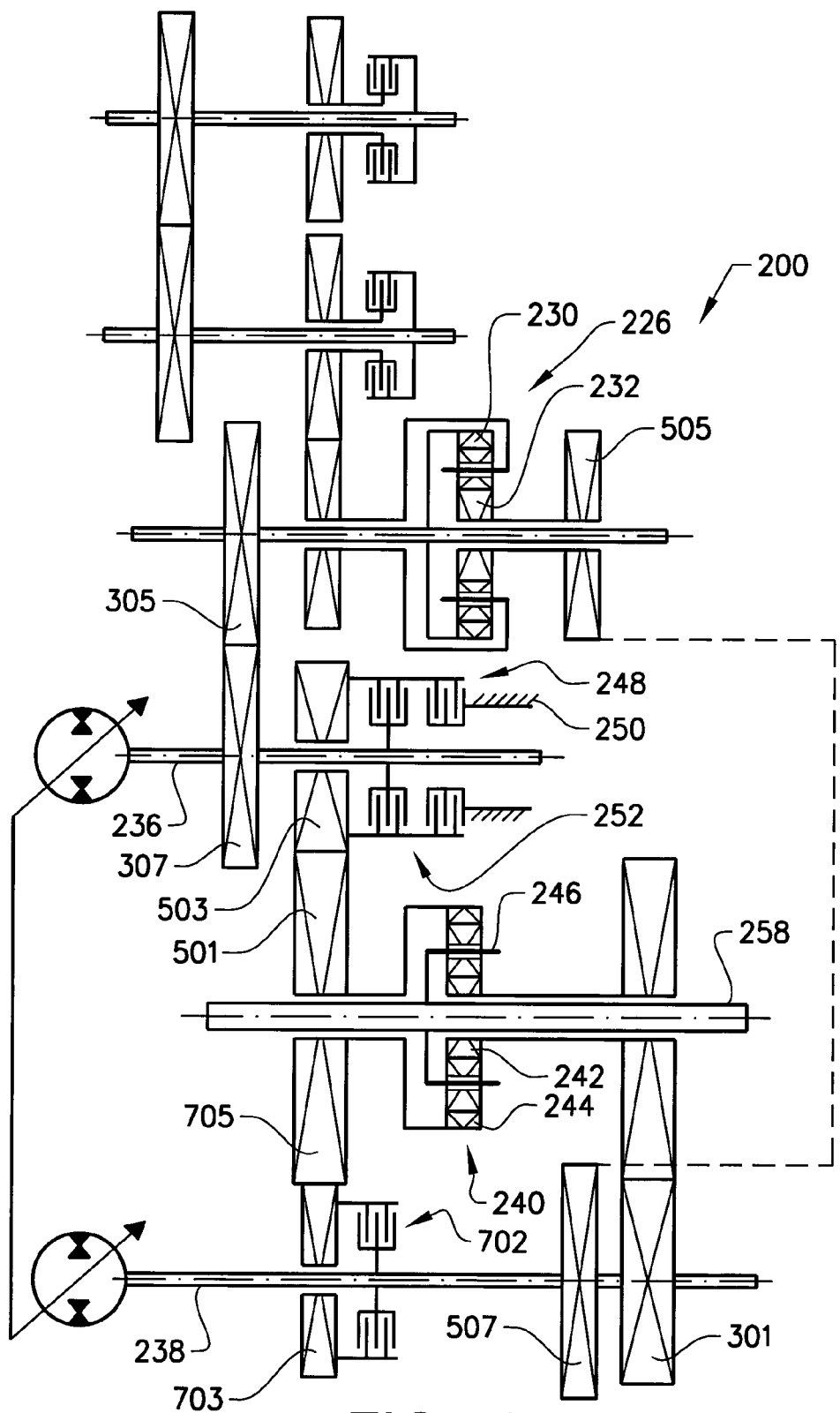

A further example embodiment of the continuously variable transmission for providing the third operating mode is illustrated in FIGS. 7a-7b. The depicted embodiment in FIGS. 7a-7b is more or less a modification of the embodiment depicted in FIGS. 5a-5b. By providing a clutch unit 702 between the ring wheel 244 of the second planetary gear set 240 and the sun wheel 242 of the planetary gear 240, the above described third operating mode may be provided by selectively engaging the clutch unit 702. Also, a gear stage 704 is arranged between the ring wheel 244 of the second planetary gear set 240 and the clutch unit 702. The gear stage 704 comprises a pair of gear wheels 703, 705 which are in meshed connection with each other. One of the gear wheels 703 is selectively connectable to the variator output shaft 238, the sun wheel 232 of the first planetary gear set 226 and the sun wheel 242 of the second planetary gear set 240. The connection between the sun wheels 232, 242 of the respective planetary gear sets 226, 240 is made via the above described gear stages 506, 302. The other one of the gear wheels 705 is connected to the ring wheel 244 of the second planetary gear set 240 and to the first 252 and second 248 clutch units.

Accordingly, the main difference between the embodiment depicted in FIGS. 7a-7b and the embodiment depicted in FIG. 6b is that the sun wheel 242 and the ring wheel 244 of the second planetary gear set 240 are selectively connectable via gear stages 302, 704. Hereby, a relative motion between the sun wheel 242 and the ring wheel 244 of the second planetary gear set 240 can be provided if the gear ratio of the gear stages 302, 704 are chosen differently. Also, when adding a gear stage 302 between the clutch unit 702 and the sun wheel 242 as depicted in FIGS. 7a-7b, the rotational direction of the shafts are different on each side of the gear stage 302. It is therefore suitable to provide a further gear stage 704 between the sun wheel 242 and the ring wheel 244 of the second planetary gear set 240, such that the rotational direction is altered twice. Furthermore, the gear wheel 705 and the gear wheel 501 are, in the example embodiment, one and the same.

Figure 8:
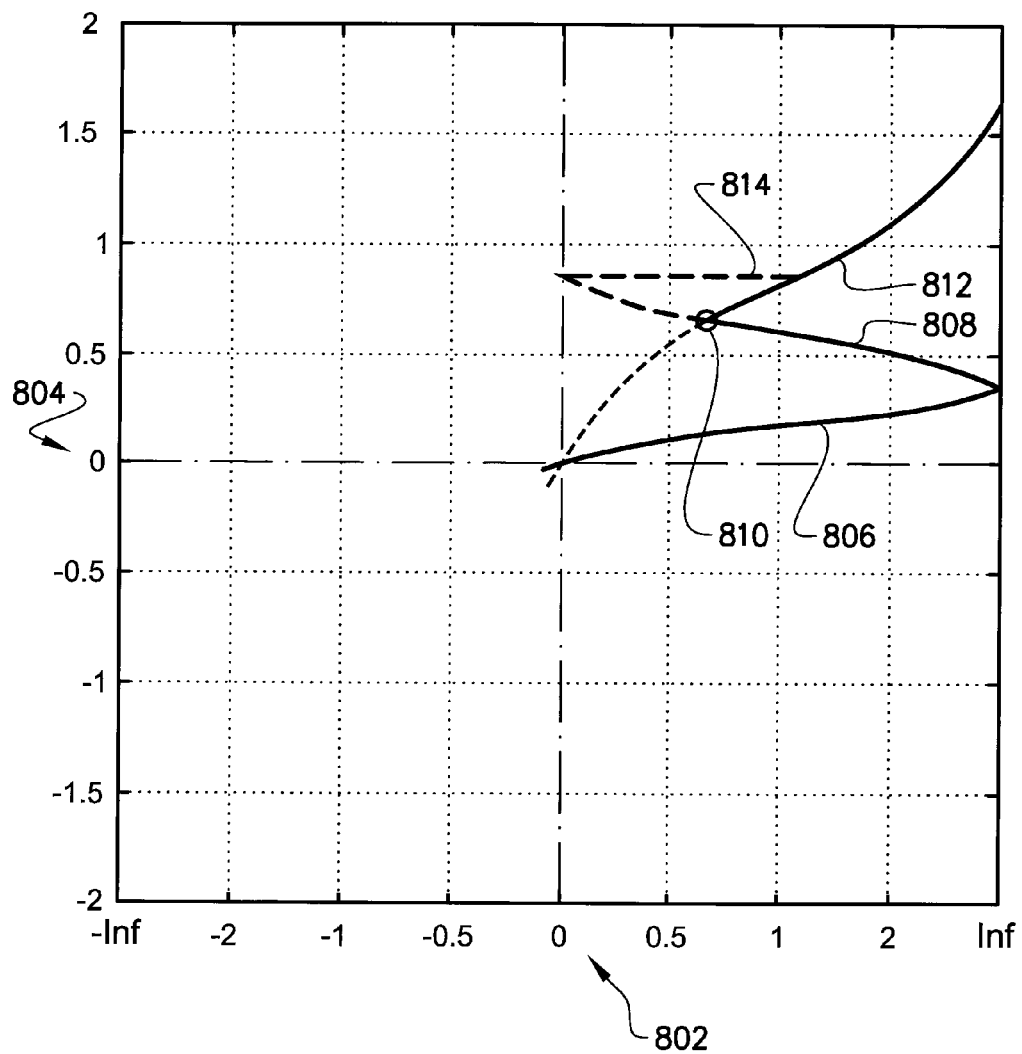
FIG. 8 schematically illustrates an embodiment for operating the continuously variable transmission according to the three exemplifying modes of operation.

Now, turning to FIG. 8, a graph illustrating the three operating modes is depicted. The x-axis 802 of the graph indicates the variator speed ratio. The variator speed ratio is the ratio between the rotational speed of the variator output shaft 238 and the rotational speed of the variator input shaft 236, i.e. $\omega 238/\omega 236$. The y-axis 804 of the graph on the other hand indicates the overall speed ratio of the gearbox. The overall speed ratio of the gearbox is the ratio between the rotational speed of the transmission output shaft 258 and the rotational speed of the transmission input shaft 204, i.e. $\omega 258/\omega 204$. FIG. 8 shows an example when the variator speed ratio is positive, which is the case for the embodiments depicted in FIGS. 3a-3b, 5a-5b and 7a-7b. For the embodiments depicted in FIGS. 2a-2b and 4a-4b, on the other hand, the variator speed ratio varies in the same way but is negative.

In the first operating mode 806, the ring wheel 244 of the second planetary gear set 240 is connected to the gearbox housing 250 by means of the second clutch unit 248. The first clutch unit 252 is in a disengaged state. The variator speed ratio 802 as well as the overall speed ratio 804 continuously increases. The first operating mode 806 is utilized until the variator speed ratio 802 is infinite, which means that the variator input shaft 236 is standing still, i.e. the relative speed over the first clutch unit 252 is zero, or close to zero.

When the variator speed ratio 802 has reached infinity the continuously variable transmission 200 is arranged to shift from the first operating mode 806 to the second operating mode 808. Hereby, and as described above, the first clutch unit 252 is positioned in an engaged state while the second clutch unit 248 is positioned in a disengaged state. Accordingly, in the second operating mode 808 the ring wheel 244 of the second planetary gear set 240 is connected to the second planetary member 230 of the first planetary gear set 226 as well as to the variator input shaft 236. The shift between the first operating mode 806 and the second operating mode 808 is made synchronously and the variator speed ratio 802 as well as the overall speed ratio 804 have the same value before and after the shift. Now, in the second operating mode 808 the variator speed ratio 802 is continuously decreasing while the overall speed ratio 804 is continuously increasing. Moreover, the second operating mode 808 can either be utilized until the variator speed ratio 802 has reached a level of zero, or close to zero, or the second operating mode 808 can be utilized until the variator speed ratio 802 has decreased to an intersection point 810 with the third operating mode 812. The intersection point 810 is defined as the point where the curve of the third operating mode 812 crosses the curve of the second operating mode 808 if the third operating mode 811 was utilized from the beginning of the working process, i.e. instead of starting with the first operating mode 806. If the shift from the second operating mode 808 to the third operating mode 812 is made at the intersection point 810, the shift is made synchronously while if shifting from the second operating mode 808 to the third operating mode 812 when the variator speed ratio has reached zero, or is close to zero, there will be a non-synchronous mode shift, illustrated by numeral 814. In the latter case, the variator speed ratio 802 will have different values before and after the shift. An advantage of the non-synchronous mode shift 814 is that there will be less losses in the variator unit since the amount of power going through the variator unit is less at the end of the second operating mode 808 in comparison to the beginning of the third operating mode 812.

Now, the third operating mode 812 is provided by engaging the clutch unit 602, 604, 606, 702 described in relation to FIGS. 6*a*-7*b* above and disengaging the first clutch unit 252. These operations may, as described above, be effected either when the variator speed ratio 802 is zero, or close to zero, or when the variator speed ratio has decreased to the intersection point 810. In the third operating mode 812, the variator speed ratio 802 as well as the overall speed ratio 804 is continuously increasing.

Although the invention has been described in relation to specific combinations of gear wheels, use of the different gear wheels may be combined in other configurations as well which is clear for the skilled person when studying the present application. Also, the present disclosure has mainly been made for running a working machine in the forward direction and it should hence be readily understood that the invention is equally applicable for reverse driving as well. Thus, the above description of the example embodiment of the present invention and the accompanying drawings are to be regarded as a non-limiting example of the invention and the scope of protection is defined by the appended claims. Any reference sign in the claims should not be construed as limiting the scope.

The invention claimed is:

1. A continuously variable transmission, comprising:
a variator unit having a variator input shaft and a variator output shaft;
a first planetary gear set having a first, a second and a third planetary member, the first planetary member being one of a ring wheel and a planet carrier, the second planetary member being the other one of the ring wheel and the planet carrier, and the third planetary member being a sun wheel, wherein the first planetary member of the first planetary gear set is operatively connected to a transmission input shaft; and
a second planetary gear set having a sun wheel, a ring wheel and a planet carrier, the planet carrier being operatively connected to a transmission output shaft; wherein the variator input shaft is operatively connected to the second planetary member of the first planetary gear set;
the variator output shaft is operatively connected to the sun wheel of the first planetary gear set, the sun wheel of the first planetary gear set being further operatively connected to the sun wheel of the second planetary gear set while having a variable gear ratio between the transmission input shaft and the transmission output shaft; and
the ring wheel of the second planetary gear set being selectively connectable to the second planetary member of the first planetary gear set and to a gearbox housing of the continuously variable transmission.

2. The continuously variable transmission according to claim 1, wherein a first clutch unit is arranged between the second planetary member of the first planetary gear set and the ring wheel of the second planetary gear set, and a second clutch unit is arranged between the ring wheel of the second planetary gear set and the gearbox housing.

3. The continuously variable transmission according to claim 2, wherein the first clutch unit and/or the second clutch unit is a friction disc clutch unit.

4. The continuously variable transmission according to claim 1, further comprising a gear wheel connected to the variator input shaft, and a gear wheel connected to the second planetary member of the first planetary gear set, the gear wheels are in meshed connection with each other.

5. The continuously variable transmission according to claim 4, wherein the gear wheel connected to the second planetary member of the first planetary gear set is further selectively connectable to the ring wheel of the second planetary gear set.

6. The continuously variable transmission according to claim 1, further comprising a gear wheel connected to the sun wheel of the first planetary gear set, and a gear wheel connected to the sun wheel of the second planetary gear set, the gear wheels are in meshed connection with each other.

7. The continuously variable transmission according to claim 6, wherein the gear wheel connected to the sun wheel of the first planetary gear set is further connected to the variator output shaft.

8. The continuously variable transmission according to claim 1, further comprising a gear wheel connected to the second planetary member of the first planetary gear set, and a gear wheel selectively connectable to the ring wheel of the second planetary gear set, the gear wheels (305, 307) are in meshed connection with each other.

9. The continuously variable transmission according to claim 8, wherein the gear wheel selectively connectable to the ring wheel of the second planetary gear set is further connected to the variator input shaft.

10. The continuously variable transmission according to claim 8, wherein the gear wheel connected to the second planetary member of the first planetary gear set is further connected to the variator input shaft.

11. The continuously variable transmission according to claim 1, further comprising a gear wheel connected to the sun wheel of the first planetary gear set, and a gear wheel connected to the variator output shaft, the gear wheels are in meshed connection with each other.

12. The continuously variable transmission according to claim 11, wherein the gear wheel connected to the variator output shaft is further connected to the sun wheel of the second planetary gear set.

13. The continuously variable transmission according to claim 1, further comprising a gear wheel connected to the ring wheel of the second planetary gear set, and a gear wheel selectively connectable to the variator input shaft, the gear wheels are in meshed connection with each other.

14. The continuously variable transmission according to claim 13, wherein the gear wheel selectively connectable to the variator input shaft is further selectively connectable to the gearbox housing of the continuously variable transmission.

15. The continuously variable transmission according to claim 1, wherein one of the sun wheel, the ring wheel and the planet carrier of the second planetary gear set is selectively connectable to another one of the sun wheel, the ring wheel and the planet carrier of the second planetary gear set.

16. The continuously variable transmission according to claim 15, wherein the sun wheel of the second planetary gear set is selectively connectable to the planet carrier of the second planetary gear set.

17. The continuously variable transmission according to claim 15, wherein the planet carrier of the second planetary gear set is selectively connectable to the ring wheel of the second planetary gear set.

18. The continuously variable transmission according to claim 15, wherein the sun wheel of the second planetary gear set is selectively connectable to the ring wheel of the second planetary gear set.

19. The continuously variable transmission according to claim 18, further comprising a gear wheel selectively connectable to the sun wheel of the first planetary gear set, and a gear wheel connected to the ring wheel of second planetary gear set, the gear wheels are in meshed connection with each other.

20. The continuously variable transmission according to claim 19, wherein the gear wheel connected to the ring wheel of the second planetary gear set is further selectively connectable to the second planetary member of the first planetary gear set and to the gearbox housing of the continuously variable transmission.

21. The continuously variable transmission according to claim 1, wherein the variator unit has a first hydraulic machine provided with the variator input shaft and a second hydraulic machine provided with the variator output shaft, the first and second hydraulic machines being hydraulically connected to each other.

22. The continuously variable transmission according to claim 1, wherein the variator unit has a first electric machine provided with the variator input shaft and a second electric machine provided with the variator output shaft, the first and second electric machines being electrically connected to each other.

23. A continuously variable transmission, comprising:
a variator unit having a variator input shaft and a variator output shaft;
a first planetary gear set having a first, a second and a third planetary member, wherein the first planetary member of the first planetary gear set is operatively connected to a transmission input shaft; and
a second planetary gear set having a first, a second and a third planetary member, the third planetary member of the second planetary gear set being operatively connected to a
transmission output shaft; wherein
the variator input shaft is operatively connected to the second planetary member of the first planetary gear set;
the variator output shaft is operatively connected to the third planetary member of the first planetary gear set, the third planetary member of the first planetary gear set being further operatively connected to the first planetary member of the second planetary gear set;
the second planetary member of the second planetary gear set being selectively connectable to the second planetary member of the first planetary gear set and to a gearbox housing of the continuously variable transmission, and wherein
one of the first, the second and the third member of the second planetary gear set is selectively connectable to another one of the first, the second and the third member of the second planetary gear set.

24. The continuously variable transmission according to claim 23, wherein the first planetary member of the second planetary gear set being selectively connectable to the second planetary member of the second planetary gear set.

25. The continuously variable transmission according to claim 23, wherein the first planetary member of the second planetary gear set being selectively connectable to the third planetary member of the second planetary gear set.

26. The continuously variable transmission according to claim 23, wherein the second planetary member of the second planetary gear set being selectively connectable to the third planetary member of the second planetary gear set.

27. The continuously variable transmission according to claim 23, wherein the first planetary member of the first planetary gear set being one of a ring wheel and a planet carrier, the second planetary member of the first planetary gear set being the other one of the ring wheel and the planet carrier, and the third planetary member being a sun wheel.

28. The continuously variable transmission according to claim 23, wherein the first planetary member of the second planetary gear set being a sun wheel, the second planetary member being a ring wheel, and the third planetary member being a planet carrier.

29. The continuously variable transmission according to claim 23, wherein the variator unit has a first hydraulic machine provided with the variator input shaft and a second hydraulic machine provided with the variator output shaft, the first and second hydraulic machines being hydraulically connected to each other.

30. The continuously variable transmission according to claim 23, wherein the variator unit has a first electric machine provided with the variator input shaft and a second electric machine provided with the variator output shaft, the first and second electric machines being electrically connected to each other.

31. A working machine comprising a continuously variable transmission according to claim 1.

32. A working machine comprising a continuously variable transmission according to claim 23.

* * * * *